United States Patent [19]
Dolan et al.

[11] 4,031,780
[45] June 28, 1977

[54] COUPLING APPARATUS FOR FULL TIME FOUR WHEEL DRIVE

[75] Inventors: Courtney F. Dolan, Syracuse; Thurman O. Ruettinger, Skaneateles, both of, NY

[73] Assignee: Chrysler Corporation, Highland Park, Mich.

[22] Filed: Nov. 29, 1974

[21] Appl. No.: 528,244

[52] U.S. Cl. .................................. 74/711; 192/35; 192/58 C
[51] Int. Cl.² .................... F16H 1/44; F16D 43/00; F16D 31/00
[58] Field of Search ............ 74/701, 705, 710, 711, 74/713, 710.5; 192/35, 57, 82 T, 54, 58 B, 58 C

[56] References Cited

UNITED STATES PATENTS

| | | |
|---|---|---|
| 3,495,298 | 2/1970 | Engle et al. ............... 74/711 X |
| 3,760,922 | 9/1973 | Rolt et al. ............... 74/710.5 X |
| 3,845,671 | 11/1974 | Sharp et al. ............... 74/711 X |
| 3,869,940 | 3/1975 | Webb et al. ............... 74/711 |
| 3,915,269 | 10/1975 | Houser ............... 192/82 T X |
| 3,923,113 | 12/1975 | Pagdin ............... 74/711 X |

FOREIGN PATENTS OR APPLICATIONS 783,772  10/1957  United Kingdom .............. 192/82 T

*Primary Examiner*—Samuel Scott
*Assistant Examiner*—Lance W. Chandler
*Attorney, Agent, or Firm*—Talburtt & Baldwin

[57] ABSTRACT

Four wheel drive train including a transfer case adapted to provide full time four wheel drive. A differential is provided in the transfer case and includes both a viscous coupling and a viscous fluid operated mechanical clutch which may be operated to inhibit and prevent differentiation.

6 Claims, 2 Drawing Figures

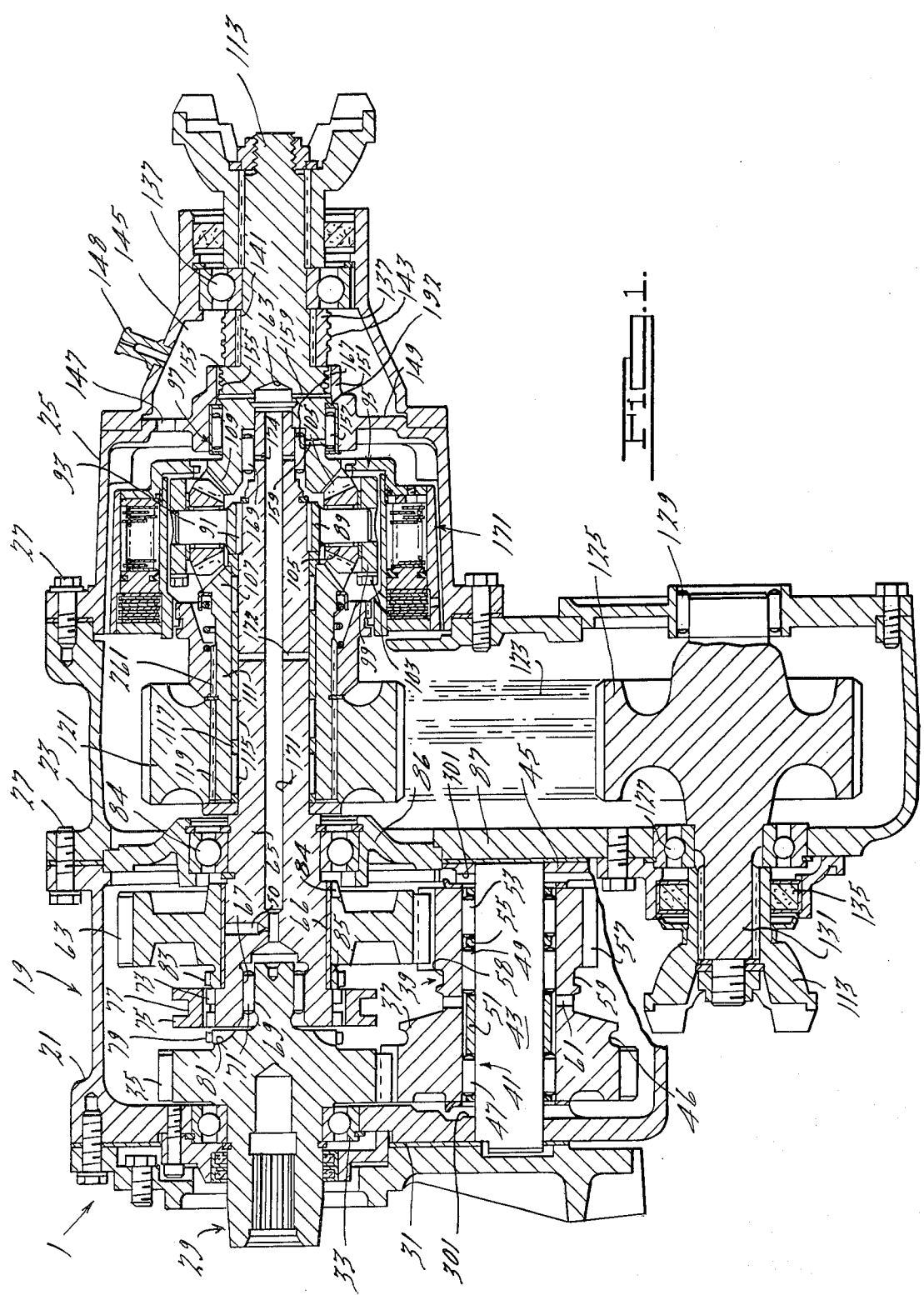

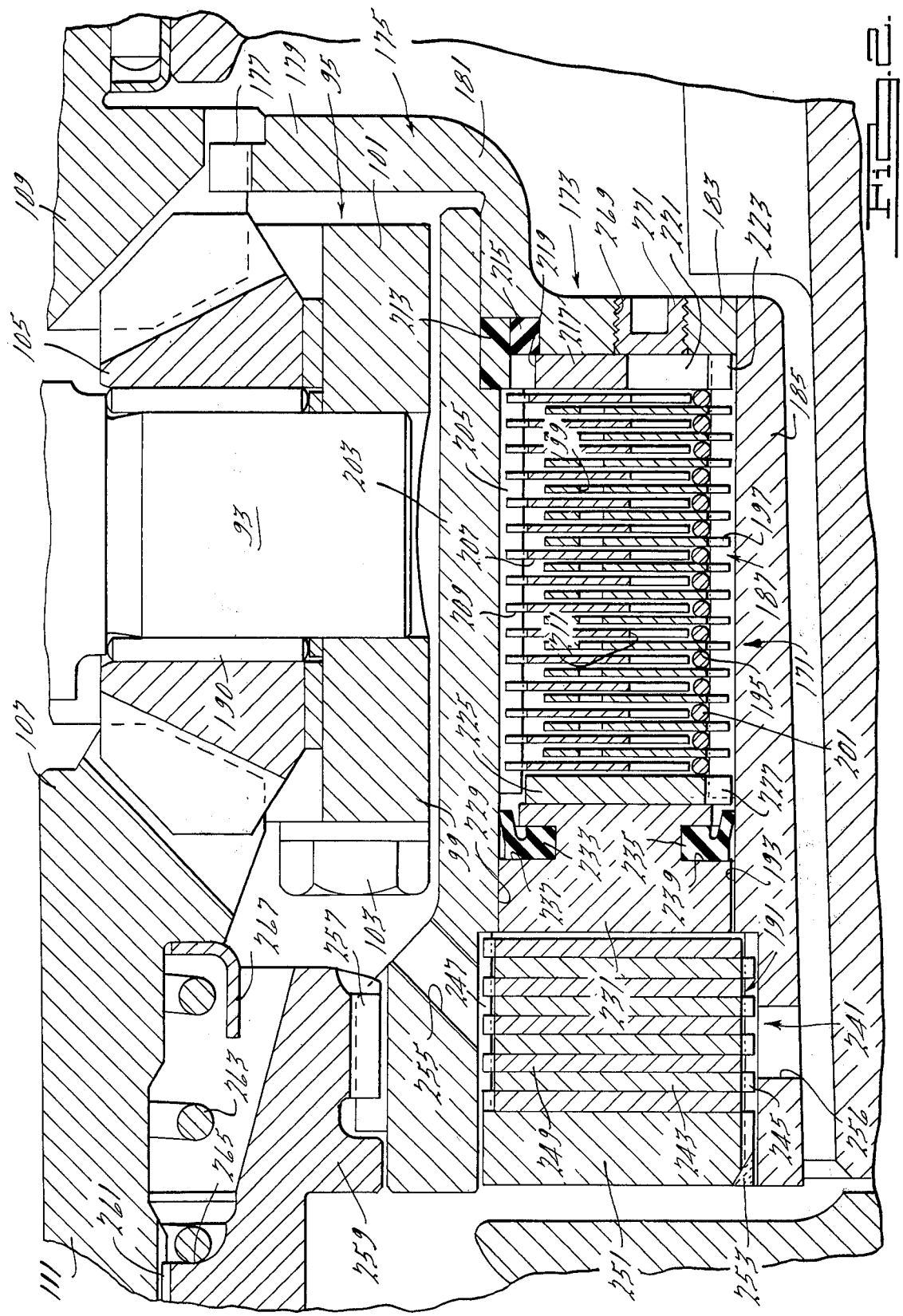

COUPLING APPARATUS FOR FULL TIME FOUR WHEEL DRIVE

BACKGROUND OF THE INVENTION

This invention relates to transfer cases for four wheel drive systems, and more particularly to a full time four wheel drive transfer case.

Four wheel drive systems have been in existence for many decades. The output of the engine was split between the front wheels and the rear wheels by a transfer case. One type of system used for many years provided undifferentiated power to all wheels of the vehicle. This gave the vehicle good mobility under adverse surface conditions. However, this type of drive was not particularly useful for normal highway driving. Since all four wheels operated at the same speed the vehicle could not be turned without sliding or scuffing one or more tires. This drawback resulted in the development of systems which included a conventional two wheel drive mechanism. For highway use the two wheel drive was utilized and this caused the vehicle to assume the characteristics of most other two wheel vehicles.

It is desirable in a four wheel drive vehicle to obtain the benefits of differentiation provided in conventional two wheel drive vehicles while also obtaining the benefits of a conventional four wheel drive, when desired. Commonly assigned copending patent application Ser. No. 409,342, now U.S. Pat. No. 3,848,691 describes a transfer case adapted to provide such characteristics. The transfer case shown in the aforenoted patent was actuated manually to lock out a differential unit when the differentiation was not desired.

It has been proposed that the manual operation be replaced by automatic locking apparatus. One type of automatically operated apparatus developed utilizes electronic sensing apparatus which senses a difference in rotation speeds of two rotatable parts of the differential. When the difference in speeds exceeds a predetermined value, a solenoid is actuated to operate a mechanical clutching mechanism which couples the two rotatable parts together and renders the differential ineffective. Copending commonly assigned U.S. application Ser. No. 331,456, filed Feb. 12, 1973 now Pat. No. 3,845,671 shows such apparatus.

Another type of automatic apparatus includes a viscous coupling having a plurality of plates connected to one rotatable member and interleaved with a plurality of plates connected to another rotatable member. Viscous fluid substantially fills the housing containing the interleaved plates. As the speed difference between two rotating parts increases, the viscous fluid is sheared by the interleaved elements, which results in a tendency to interlock the rotatable parts.

The present invention relates to apparatus which includes both mechanical and viscous coupling features.

BRIEF SUMMARY OF THE INVENTION

Briefly, this invention comprises a transfer case adapted to provide a full time four wheel drive with differentiation of the drive to the front and rear axles within a predetermined range of speed difference between two drive components, but which is adapted automatically to lock out the differential during certain periods.

One of the primary objects of this invention is to provide a transfer case which provides a full time four wheel drive at all times, both forward and reverse, and which automatically shifts between a differentiating and non-differentiating condition.

Another object of this invention is to provide a transfer case of the class described which utilizes a characteristic of one coupling apparatus for actuating a second coupling apparatus.

A further object of this invention is to provide a transfer case of the class described which utilizes a characteristic of viscous fluid of a viscous coupling to actuate a mechanical clutch for locking up a differential to provide a nondifferentiating drive to the front and rear wheel sets.

Still another object of this invention is to provide a transfer case of the type described having a differential which may be automatically locked out to provide a positive drive to the front and rear sets of wheels, the lockout being accomplished by utilizing the expansion characteristics of a viscous fluid to actuate a mechanical clutch.

A further object of this invention is to provide a transfer case of the class described which is economical in construction and efficient in operation.

Other objects and advantages will be made apparent as the description progresses.

BRIEF DESCRIPTION OF THE DRAWINGS

In the accompanying drawings, in which one of various possible embodiments is illustrated, FIG. 1 is a section taken through a transfer case constructed in accordance with this invention; and FIG. 2 is an enlarged fragmentary view of the transfer case shown in FIG. 1.

Like parts are indicated by corresponding reference characters throughout the several views of the drawings.

DESCRIPTION OF THE PREFERRED EMBODIMENT

Referring now to the drawings, a transfer case constructed in accordance with the invention is generally indicated at 1. The transfer case is conventionally utilized in the drive train of a recreational or truck vehicle (not shown). As shown in the aforenoted U.S. patent the transmission output shaft is connected to the transfer case 1 which feeds the power through a propshaft to a front axle and front wheels, and through a rear propshaft to a rear axle for the rear wheels of the vehicle.

The transfer case 1 includes a housing 19 formed in three sections 21, 24 and 25 suitable interconnected by fasteners 27. An input shaft 29 is rotatably mounted in one wall 31 of housing 19 by bearings 33. Shaft 29 has an input drive gear 35 formed integrally therewith which meshes with a larger gear 37 forming one gear of a gear cluster 39 rotatably journaled by bearing means 41 on a shaft 43 extending between wall 31 and a wall 45 of section 21. An annular lubricant trough or slinger 46 is provided on gear 37 adjacent the teeth thereof. The purpose of trough or slinger 46 will be made apparent hereinafter. Bearing means 41 includes a first set 47 of roller bearings separated from a second set 49 of roller bearings by an annular spacer 51. Set 49 is separated from a third set 53 of bearings by a narrow annular spacer 55.

A second gear 57 of gear cluster 39 is spaced from gear 37 by a neck 59 having a plurality of radially extending lubricating ports 61 therein for facilitating the flow of lubricant to and from bearing means 41. Gear 57 is smaller than gear 37 and is in constant mesh with a gear 63 rotatably mounted on an elongated shaft 65 by a bushing 66. Gear 57 is also provided with a lubricating or slinger trough 58 and the gear teeth of gear 57 are slightly wider than the teeth of gear 63 for a purpose to be made apparent hereinafter.

The end of shaft 65 has a bore 67 therein in which the end 69 of shaft 29 is piloted. Bearings 71 rotatably support shaft 29. Clutching teeth 73 are formed on the outer periphery of shaft 65 and a clutch 75 surrounds and meshes with such teeth. Clutch 75 has a groove or recess 77 therein which receives an actuating yoke (not shown) for shifting the clutch to the right or left as viewed in FIG. 1. Shaft 29 is provided with clutching teeth 79 at its inner and adjacent gear 35. Troughs or ports, the bottoms of which are curved, are provided at 81 between the teeth 79.

Gear 63 is also provided with a set of clutching teeth 83 on the collar 85 thereof adjacent teeth 73. As will be understood, clutch 75 may be moved to the left as viewed in FIG. 1 to couple shaft 28 directly to shaft 65 or moved to the right to couple gear 63 to shaft 65. Gear 63 is constantly driven by shaft 29 through the gear reduction set comprising gears 35, 37 and 57.

Shaft 65 is supported by bearings 84 in a plate 86 mounted in wall 45 and a wall 87 of section 23 and extends rearwardly through section 23 and section 25. A collar 89 is splined at 91 to shaft 65 and has a plurality of pinion shafts 93 connected thereto and extending radially therefrom. Shafts 93 are secured at their outer ends in a carrier 95 of a differential unit 97 formed of two separate parts 99 and 101 and joined together by fasteners 103.

Pinions 105 are rotatably supported by shafts 93 on bearing sets 190 and are in mesh with two side gears 107 and 109, one of which has a tubular extension 111 and the other of which is formed on the end of an output shaft 113. Gear 107 and extension 111 are rotatably mounted on shaft 65 by a plurality of sets 115 of bearings separated by spacers 117.

Mounted on extension 111 by spline connection 119 is a sprocket 121. This sprocket is connected by a chain 123 to a front wheel drive sprocket 125 rotatably mounted by bearings 127 and 129 in section 23 of the three-part housing. The shaft 131 of sprocket 125 is spline connected to a yoke 133 which is adapted to be connected to the forwardly extending propshaft. A suitable seal is provided at 135.

The output shaft 113 is rotatably mounted by bearings 137 in the rearward end of section 25 of the housing. A collar 139 is splined at 141 to the shaft 113 and has a speedometer thread 143 thereon.

The speedometer thread 143 is located in a chamber 145 formed in section 25. Chamber 145 is adapted to be supplied with lubricant through pie-shaped openings 147 in wall 149. A breather fitting 148 is located on the outer wall of chamber 145 to permit operation with temperature and pressure variations.

A wall 149 is provided in section 25 and includes a hub 151 through which the shaft 113 extends. The opening through hub 151 has two portions, the first of which surrounds a lubricant feeding thread portion 153 of shaft 113. The lubricant feeding portion 153 has a thread 155 thereon for feeding lubricant from chamber 145 through the first portion of the opening in hub 151 toward the differential 97. A second portion of the opening in hub 151 surrounds bearings 157 which rotatably support the shaft 113. Radially extending lubricant ports or passages 159 are provided therein. Port 159 is located at the inward end of the lubricant feeding thread 155 and directs the oil to a bore 163. Seal 192 behind bearing 157 prevents oil passage directly to bearing 157. A counterbore is provided at 167 in the gear 109 and shaft 113. The counterbore 167 pilots the right-hand end of the shaft 65 as viewed in FIG. 1. Bearings 169 rotatably support the end of shaft 65 in the counterbore 167.

An elongated passage 171 extends from one end of the shaft 65 to the other, placing the bore 67 in communication with the bore 163. Radial ports 159, 172 and 174 extend from passage 171 to the bearings 157, 115 and 169, respectively. As will be made apparent hereinafter, the various passages in the shafts provide for lubrication of the movable components of the transfer case.

The automatic coupling apparatus is generally indicated at 171 and includes a clutch housing assembly 173. Housing assembly 173 includes an annular end plate or head 175 splined on its inner periphery to side gear 109 as indicated at 177. Plate 175 includes an inner radially extending portion 179 at the outer end of which there is an axially extending annular inner drum supporting portion 181. A second radially extending portion 183 extends outwardly from the end of axially extending drum supporting portion 181.

The outer periphery of radially extending portion 183 is secured as by welding for example to an outer drum member 185. Drum 185, as shown has a viscous coupling splined portion 187 and a friction clutch splined portion 191 separated by an inner peripheral cylindrical section 193.

Splines 187 mount a plurality of viscous coupling plates 195. These plates are annular ring-shaped members having splines 197 at the outer periphery and a plurality of openings or holes 199 therein for a purpose described hereafter. The plates 195 are separated by annular ring spacers 201 which expand to have an outside diameter approximately equal to the inside diameter of the splined portion 187 when the rings are installed.

The inner drum supporting portion 181 is slideably engaged with one end of an inner drum 203. Drum 203 has a splined portion 205 aligned with splines 187 which drivingly mount a plurality of inner annular viscous coupling plates 207. These plates are flat annular rings having splines 209 on the inner periphery and a plurality of generally radially extending slots 211 spaced around the outer periphery of the plates for a purpose to be made apparent as the description progresses. The plates 207 are interleaved with plates 195 and float between the latter. A bearing seal, such as a Teflon ring, for example, is indicated at 213 and a ring 215 surrounds ring 213. Between the end plate 207 and the radial portion 183 there is an annular end plate 217 having a plurality of holes 219 and 221 therein and teeth 223 which couple the plate with splines 187. The holes enhance the viscous coupling effect as well as permit fluid to pass through the plate.

The other end of the viscous clutch pack is closed by an annular pressure plate 225 splined to the outer drum 185 at 227. Slideably mounted in the inner peripheral cylinder section 193 and an outer peripheral cylindrical section 228 of inner drum 203 is an annular piston 231 having internal and external annular seals 233 and 235, respectively, mounted in recesses 237 and 239.

One end of piston 231 is adapted to be engaged by pressure plate 225 and the other end is adapted to engage the end plate of a friction clutch assembly 241. This assembly includes a plurality of annular outer clutch plates 243 splined at 245 with splines 191 of the outer drum. The inner drum 203 has a plurality of splines 247 which drivingly mount annular inner friction clutch plates 249. A backing member 251 is secured, as by welding 253, for example to the outer drum 185.

At least one lubrication port 255 is formed in drum 203 to permit the flow of lubricant to the clutch 241. At least one port 256 is formed in drum 185 to permit lubricant to flow from the clutch pack. The end of drum 203 is splined as indicated at 257 in driving relationship with a driving hub 259. Hub 259 is splined at 261 to the extension 111 of side gear 107. A coil spring 263 extends between a shoulder 265 in hub 259 and a retainer 267 positioned against the outer side of gear 107.

The plate 183 has an opening 269 which is used for filling the clutch chamber formed by the inner and outer drums 203 and 185, and plates 217 and 225 with the predetermined quantity of viscous fluid. The fluid, both in amount and type may be of the type shown in U.S. Pat. No. 3,760,922, for example, although other types and amounts of viscous fluid could be utilized. Similarly, while the plates 195 and 207 shown herein may be similar to the plates shown in U.S. Pat. No. 3,760,922, it will be understood that plates with other configurations may be utilized.

After the desired amount of fluid has been inserted in the viscous chamber, the hole 269 is closed by a plug 271. With regard to the amount of fluid in the chamber it should be noted that it has been determined that improved results are sometimes obtained in viscous couplings by providing a certain amount of gas, such as air, with the viscous fluid. The torque-transmitting capability of the viscous coupling is the result of many factors, not the least of which is the volume or quantity of gas, as well, as the viscosity of the fluid, spacing of the plates, and the openings and slots and patterns thereof. These viscous fluids are generally a silicone fluid, having a viscosity which may be within a wide range of commercially available values. The Dow Corning Corporation of Midland, Mich. makes a wide range of silicone fluids suitable for use in couplings of the viscous type. For example, Dow Corning silicone fluid Number 200 is of this type and presently can be obtained with viscosities ranging from 0.65 to 100,000 centistokes at 25° C. In any event, the chambers are often initially subjected to a vacuum and then filled with fluid. Next a predetermined amount of fluid may be removed from the chamber and replaced with gas, thus assuming an accurate gas to viscous fluid ratio.

One of the problems associated with viscous couplings utilizing a plurality of interleaved plates is that the temperature of viscous fluid increases as the fluid shears during the torque transmitting and transferring operation. As the temperature rises, the fluid expands. Various types of bellows devices and pistons have been utilized to permit such expansion. One type of arrangement includes a small piston in a wall of the chamber which is moved outwardly upon expansion of the fluid. The piston is biased by a light spring in opposition to the forces created by expanding fluid. The piston merely permits the fluid to expand. Other devices employ bellows for the same purpose. As will be made apparent in the following description of the operation of the apparatus, this invention utilizes expansion characteristics of the fluid to actuate and operate the friction clutch.

Operation of the transfer case of this invention is as follows:

Assuming the various parts are as shown in FIG. 1, such as may occur when a power take-off unit is operative to drive other equipment, no drive is transferred from the input shaft 29 to the output shafts 113 or the forwardly extending stud shaft of sprocket 125. This is because clutch 75 does not engage the shaft 65 with either gear 35 or gear 63. The input shaft 29 and gear 35 rotate the gear cluster 39 and this rotates the gear 63. However, since the gear 63 is rotatably mounted on shaft 65 no rotation is imparted to such shaft. Lubrication of the pilot bearings 71 is accomplished by means of the slinger 46. Lubricant is slung off the lip of the slinger or trough upwardly into the space between the teeth 79 and the face of shaft 65. The lubricant then flows into the bore 67 to the bearings 71. The lip of trough 58 and the ends of the teeth of gear 57 which extend beyond the ends of the teeth of gear 63 all act as slinger rings to sling lubricant up to the interface between clutch 75 and the face of teeth 83 and to diametrically opposed passages 84 for lubricating the bushing 66. If the clutch 75 is moved to the right the teeth thereof couple the teeth 73 and 83 of the shaft 65 and gear 63, respectively, thereby coupling the gear to the shaft. Accordingly, a low range drive is transmitted to the shaft 65 through the gear 35, gear cluster 39, gear 63 and clutch 75. The rotation of shaft 65 is imparted to the collar 89, and carrier 95 through shafts 93. The differential 97 acts as a conventional differential and if the resistance to rotation of the front and rear vehicle wheels is the same the carrier 95 and pinions 105 rotate side gears 107 and 109 at the same rate and in the same direction. The side gear 107 drives the sprocket 121 through the spline connection 119, and the sprocket 121, through chain 123, drives the sprocket 125. Rotation of the sprocket 125 is transmitted through yoke 133 and the propshaft to the differential for the front axle. The differential for the front axle permits differentiation between the two front wheels of the vehicle.

The drive to the differential for the rear axle is transmitted from side gear 109, through shaft 113, coupling 189 and the propshaft.

The level of lubricant in the transfer case may vary, but it is preferable that it be sufficiently high in the forward section 21 to permit the ingress and egress of lubricant through ports 301 in walls 45 and 31 of housing 21 into the bearings 47, 49 and 53 passing out through port 61 of gear 37. Lubricant is also pumped by threads 155 to port 159 and through the port to passage 171. From passage 171 lubricant flows through ports 173 to bearings 115 and through port 50 to bushing 66. Lubricant is also pumped by threads 155 through port 159 to elongated bore 171 to bearings 157 and therethrough ports 174 to bearings 169 thence through port 161 to bearing 157.

Differentiation between front and rear axles is required when the front wheels of the vehicle travel in a different distance than the rear wheels, such as may occur in cornering, for example. Also, varying tire radii, due to load distribution or tire pressure, require different axle speeds. If the conditions are such that different axle speeds are required between the front and rear axles the differential 97 will differentiate to accomplish its specific mission. The side gear 107 rotates at a different speed than the side gear 109 to effect such different drive speeds to the axles.

As the side gear 107 rotates at a different speed than gear 109, the plates 207 rotate relative to plates 195. During normal driving conditions, such as occur on turning corners for example, the torque transmitted by the shearing of viscous fluid is minimal. The two drums 185 and 203 are rotating at substantially the same speed and neither the viscous coupling nor the friction coupling are effective. The temperature of the fluid does not rise significantly during such operation.

Should conditions be such that both wheels of one set of wheels, for example, encounter a substance where the friction between road and wheel is considerably less than the other set of wheels, the differential will tend to supply all of the drive to the one set. As the speed difference between the two gears 107 and 109 increases, the torque transmitting capability of the viscous coupling progressively increases due to the shearing of the viscous fluid between the plates 195 and 207. Thus, the drums 185 and 203, and consequently gears 107 and 109 will tend to be driven together by the viscous coupling.

As the temperature of the fluid rises, due to the shearing thereof, the fluid expands and applies an outward force on piston 231. This forces the piston against the disc clutch pack formed by plates 245 and 249 causing the latter to tend to lock together and thereby cause the inner and outer drums to lock together. Accordingly, if the drums are locked together the same rotation forces are inparted to both side gears and consequently, the front and rear output shafts are rotated together.

The coupling effect of the friction coupling, i.e., the torque transmitted by it is directly proportional to the axial force imposed on piston 231. Accordingly, the coupling effect of apparatus is a result of the coupling effect of a viscous clutch and the coupling effect of a friction clutch operated as a result of the increase in temperature of fluid in the viscous clutch. The percentage of gas included in the viscous clutch fluid may be varied and any changes will adjust the engagement time and the initial softness of the coupling assembly.

In view of the foregoing, it will be seen that the several objects and other advantages of this invention are achieved.

Although only one embodiment of the invention has been disclosed and described, it is apparent that other embodiments and modifications of the invention are possible.

I claim:

1. Coupling apparatus for power drive systems comprising first and second rotatable elements adapted to be coupled together, a first coupling device comprising a viscous coupling chamber, a first set of viscous coupling members in said chamber drivingly connected to one rotatable element, and a second set of viscous coupling members in said chamber, interleaved with said first set of viscous coupling members and drivingly connected to the other rotatable element, viscous fluid in said chamber adapted to be sheared when said members are rotated relative to one another, said fluid transmitting torque from one set of coupling members to the other and increasing in temperature as a result of shearing action, said fluid expanding as its temperature increases, and a second coupling device adapted to be actuated by the expansion of fluid in said first coupling device, said second coupling device comprising a second chamber closed at one end, a first set of friction coupling members in said second chamber drivingly connected to one rotatable element, a second set of friction coupling members in said second chamber drivingly connected to the other rotatable element, and a piston at the other end of said second chamber and adjacent said viscous coupling chamber, said viscous fluid applying pressure on said piston to move the same toward and apply pressure on said friction coupling members in response to the expansion of said viscous fluid in said viscous coupling chamber.

2. Coupling apparatus as set forth in claim 1 wherein means are provided to provide lubrication to said first and second rotatable elements, and first passage means extending through said second chamber to permit the ingress of lubrication from said rotatable elements to said friction coupling members, and second passage means in said chamber to permit the egress of lubrication from said friction coupling members.

3. Coupling apparatus as set forth in claim 1 wherein said first chamber comprises a first annular drum, and a second annular drum smallar than said first drum, said drums each having first and second splined portions separated by a piston carrying portion, the first splined portions of said drums drivingly connecting said drums to said first and second viscous members, and said second splined portions drivingly connecting said drums to said first and second sets of friction coupling members, said piston riding on said piston carrying portions and adapted to apply pressure to said first and second sets of friction coupling members when the viscous fluid in said viscous coupling chamber expands due to the shearing of such fluid during torque transmission by said fluid from one set of viscous coupling members to the other set of viscous coupling members. friction coupling members in said second chamber drivingly connected to the other rotatable element, and a piston at the other end of said second chamber and adjacent said viscous coupling chamber, said viscous fluid applying pressure on said piston to move the same toward and apply pressure on said friction coupling members in response to the expansion of said viscous fluid in said viscous coupling chamber.

4. Coupling apparatus for power drive systems comprising a differential including first and second side gear members, an annular carrier member, pinion shafts connected to said carrier member and extending radially inward, means drivingly connected to said pinion shafts for rotating said carrier member pinions carried on said pinion shafts and meshing with said side gear members, a viscous coupling connected to two of said members for transmitting torque therebetween, said viscous coupling including a viscous fluid adapted to increase the temperature and expand during torque transmission thereby in said viscous coupling, a friction clutch connected to two of said members for transmitting torque therebetween, and means movable in response to the expansion of said viscous fluid for actuating said friction clutch, said viscous coupling and said friction clutch including an inner drum and an outer drum, said inner drum surrounding said carrier member and connected to one of said members, said outer drum surrounding said inner drum and having a diameter greater than the diameter of said inner drum to provide space therebetween, a plurality of first viscous coupling plates drivingly connected to one of said drums and located in said space, a plurality of second viscous coupling plates interleaved with said first viscous coupling plates and drivingly connected to the other drum, said viscous fluid being located between said viscous coupling plates, a first set of friction clutch plates drivingly connected to said one drum and a second set of friction clutch plates interleaved with said first set of friction clutch plates and drivingly connected to said other drum, said means for actuating said friction clutch comprising a piston in said space, said piston being adapted to apply pressure on said friction clutch plates in response to pressure applied thereto by said expanding viscous fluid.

5. A transfer case assembly having an input shaft and two output shafts extending in opposite directions, first and second rotatable elements drivingly connected to said two output shafts, means drivingly connecting said input shaft to said rotatable elements in a manner to permit said elements to rotate at different speeds, a first coupling device, a viscous coupling chamber, a first set of viscous coupling members in said chamber drivingly connected to one rotatable element, and a second set of viscous coupling members in said chamber, interleaved with said first set of viscous coupling members and drivingly connected to the other rotatable element, viscous fluid in said chamber adapted to be sheared when said members are rotated relative to one another, said fluid transmitting torque from one set of coupling members to the other and increasing in temperature as a result of shearing action, said fluid expanding as its temperature increases, and a second coupling device adapted to be actuated by the expansion of fluid in said first coupling device, said second coupling device comprising a second chamber closed at one end, a first set of friction coupling members in said second chamber drivingly connected to one rotatable element, a second set of friction coupling members in said second chamber drivingly connected to the other rotatable element, and a piston at the other end of said second chamber and adjacent said viscous coupling chamber, said viscous fluid applying pressure on said piston to move the same toward and apply pressure on said friction coupling members in response to the expansion of said viscous fluid in said viscous coupling chamber.

6. A transfer case assembly as set forth in claim 5 wherein said viscous coupling chamber comprises a first annular drum, and a second annular drum smaller than said first drum, said drums each having first and second splined portions separated by a piston carrying portion, the first splined portions of said drums drivingly connecting said drums to said first and second viscous coupling members, and said second splined portions drivingly connecting said drums to said first and second sets of friction coupling members, a piston riding on said piston carrying portions and adapted to apply pressure to said first and second sets of friction coupling members when the viscous fluid in said viscous coupling chamber expands due to the shearing of such fluid during torque transmission by said fluid from one set of viscous coupling members to the other set of viscous coupling members.

* * * * *